(12) United States Patent
Chappaz

(10) Patent No.: US 7,254,369 B2
(45) Date of Patent: Aug. 7, 2007

(54) PROCESS AND DEVICE FOR ESTIMATING THE SPEED OF MOVEMENT OF A MOBILE TERMINAL OF A WIRELESS COMMUNICATION SYSTEM

(75) Inventor: David Chappaz, Saint-Julien en Genevois (FR)

(73) Assignee: STMicroelectronics N.V., Amsterdam (NL)

( * ) Notice: Subject to any disclaimer, the term of this patent is extended or adjusted under 35 U.S.C. 154(b) by 686 days.

(21) Appl. No.: 10/233,055

(22) Filed: Aug. 30, 2002

(65) Prior Publication Data
US 2003/0054771 A1  Mar. 20, 2003

(30) Foreign Application Priority Data
Sep. 3, 2001  (EP) .................................. 01120682

(51) Int. Cl.
H04B 17/00 (2006.01)
G01S 13/78 (2006.01)
G01P 21/00 (2006.01)

(52) U.S. Cl. ...................... 455/67.11; 342/46; 73/1.37

(58) Field of Classification Search ............. 455/67.11, 455/441, 456.1–456.6, 442, 67.13, 67.14, 455/33.4, 437, 442.1, 456; 342/46.1, 418, 342/67.1, 357, 46, 67; 73/1.37
See application file for complete search history.

(56) References Cited

U.S. PATENT DOCUMENTS 5,758,264 A * 5/1998 Bonta et al. ............... 455/67.7
5,974,087 A * 10/1999 Nowara ...................... 375/226
6,370,357 B1 * 4/2002 Xiao et al. ............... 455/67.11

FOREIGN PATENT DOCUMENTS

DE          19923690      12/2000
EP           1052820      11/2000
WO           98/16079      4/1998

* cited by examiner

*Primary Examiner*—Naghmeh Mehrpour
(74) *Attorney, Agent, or Firm*—Lisa K. Jorgenson; Allen, Dyer, Doppelt, Milbrath & Gilchrist, P.A.

(57) ABSTRACT

Estimating the speed of movement of a mobile terminal includes estimating the impulse response of the transmission channel at a given instant, and estimating the time derivative of the estimated impulse response. Estimating the speed also includes determining a ratio of the energy of the estimated impulse response to the energy of the estimated time derivative.

30 Claims, 3 Drawing Sheets

PROCESS AND DEVICE FOR ESTIMATING THE SPEED OF MOVEMENT OF A MOBILE TERMINAL OF A WIRELESS COMMUNICATION SYSTEM

FIELD OF THE INVENTION

The present invention relates to the transmission of digital information, such as the exchange of digital information associated with a cellular mobile telephone operating in the GSM network system. The present invention relates more particularly to estimating the speed of a mobile terminal, such as a cellular mobile telephone communicating with a base station.

BACKGROUND OF THE INVENTION

Each base station of a communication system radiates within a cell, and consequently, talks to all the telephones situated in this cell. When the user of a telephone moves and reaches the border of a cell, the base station can decide, depending on specific parameters measured by the telephone, to hand the telephone over to another base station.

Estimation of the speed of movement of the mobile telephone is a parameter which may be taken into account by the base station in deciding whether to transfer to another base station. There is a need to better estimate the speed of movement of such a mobile terminal.

SUMMARY OF THE INVENTION

The invention therefore proposes a process for estimating the speed of movement of a mobile terminal of a wireless communication system communicating with a base station via a transmission channel. According to this process, the estimation of the speed comprises an estimation of the impulse response of the transmission channel at a given instant, an estimation of the time derivative of this estimated impulse response, and a determination of a ratio comprising a denominator taking into account the energy of the estimated impulse response and a numerator taking into account the energy of the estimated time derivative of this impulse response.

Stated otherwise, the speed of the mobile terminal is estimated by determining a ratio of two energies which relate to the impulse response of the channel and to its time derivative.

The estimation of the impulse response of the channel and the estimation of its time derivative can be performed in different ways. According to a first variation of the invention, estimation of the impulse response of the channel is performed by averaging two independent successive estimations of the impulse response of the channel, temporally separated by a chosen predetermined duration for preserving a correlation between the two successively estimated impulse responses. Moreover, the estimation of the time derivative is performed by determining the time variation over the predetermined duration between the two independent successive estimations of the impulse response. The person skilled in the art will be able to adjust this predetermined duration as a function of the Doppler frequency.

It is possible to choose a predetermined duration T such that the product of this predetermined duration T and the Doppler frequency Fd is less than or equal to 10. The Doppler frequency Fd is equal to F0*V/C, where F0 designates the carrier frequency of the information conveyed on the channel, V designates the speed of movement of the mobile terminal, and C designates the speed of light.

When the transmission channel is temporally subdivided into frames each comprising several time intervals, the transmission of the information between the base station and the terminal is performed over successive frames within at least two consecutive time intervals of each frame. In this case, the two independent successive estimations of the impulse response of the channel may be performed on the basis of the respective information received in the course of the two respective consecutive time intervals. The correlation between the two successively estimated impulse responses is then preserved.

According to another variation of the invention, which also applies to the case where the transmission of the information is performed over successive frames within at least two consecutive time intervals of each frame, the estimation of the impulse response of the channel and the estimation of this time derivative may be performed jointly on the basis of the information received in the course of the two consecutive intervals. Such a joint estimation may be performed, for example, by using a least squares technique.

According to another variation of the invention, when the transmission of the information between the base station and the terminal is performed over successive frames within a single time interval of each frame, the estimation of the impulse response of the channel and the estimation of this time derivative may be performed on the basis of the information received in the course of this single time interval. Here again, it is possible to use an estimation based on the least squares technique.

Regardless of the particular variation of the invention, the estimation noise in the coefficients of the impulse response and of its derivative gives rise to a bias in the estimation of their energy. When the average energy of the estimation noise is known, it is preferable to deduct this energy to obtain unbiased estimations. To determine the numerator and the denominator, it is preferable to deduct the mean energy of the noise from the two corresponding values of energy.

It is especially advantageous for the denominator to result from a first average, for example, a sliding average, of successive values of energy corresponding to impulse responses successively estimated at successive instants. Furthermore, it is also especially advantageous for the numerator to result from a second average, for example, a sliding average, of successive values of energy corresponding to the time derivatives of the successively estimated impulse responses. Thus, such a mode of implementation makes it possible to smooth any variations in energies brought about by noise.

The subject of the invention is also directed to a device for estimating the speed of movement of a mobile terminal of a wireless communication system talking to a station by way of a transmission channel. The device comprises first means of estimation able for performing an estimation of the impulse response of the transmission channel at a given instant, and second means of estimation able for performing an estimation of the time derivative of this estimated impulse response. The device further comprises means for estimating the speed. The means for estimating the speed comprises first means of determination for determining a denominator taking into account the energy of the estimated impulse response, second means of determination for determining a numerator taking into account the energy of the estimated time derivative of this impulse response, and means of calculation for computing the ratio of the numerator to the denominator.

According to a first implementation of the invention, the first means of estimation perform the estimation of the impulse response of the channel by averaging two successive estimations of the impulse response of the channel, temporally separated by a chosen predetermined duration in such a way as to preserve a correlation between the two successively estimated impulse responses. Furthermore, the second means of estimation performs the estimation of the time derivative by determining the time variation over the predetermined duration, between the two independent successive estimations of the impulse response.

When the transmission channel is temporally subdivided into frames each comprising several time intervals, and the transmission of the information between the base station and the terminal is performed over successive frames within at least two consecutive time intervals of each frame, the first means of estimation may, for example, perform the two respective successive estimations of the impulse response of the channel on the basis of the information received in the two respective consecutive time intervals.

According to another embodiment of the invention, the first means of estimation and the second means of estimation can jointly perform the estimation of the impulse response of the channel and the estimation of its time derivative on the basis of the information received in the two consecutive time intervals.

According to another embodiment of the invention, more especially applicable when the transmission is performed within a single time interval of each frame, the first means of estimation performs the estimation of the impulse response of the channel and of its time derivative on the basis of the information received in this single time interval.

Regardless of the particular embodiment of the invention, when the average energy of the estimation noise is known, the first and second means of determination advantageously comprise means of subtraction for deducting the mean energy of the noise from the two corresponding values of energy.

Furthermore, irrespective of the embodiment used, the first means of determination advantageously comprise first means of smoothing for computing a first average, for example, a sliding average, of successive values of energy corresponding to impulse responses successively estimated at successive instants. Likewise, the second means of determination advantageously comprise second means of smoothing for computing a second average, for example, a sliding average, of successive values of energy corresponding to the time derivatives of the successively estimated impulse responses. The means of determination, calculation and subtraction may be embodied in a functional manner in the form of software blocks incorporated into the speed estimation means.

The subject of the invention is also directed to a remote mobile terminal of a wireless communication system comprising a speed estimating device as defined above. The invention also proposes a base station of a wireless communication system incorporating a speed estimating device as defined above.

BRIEF DESCRIPTION OF THE DRAWINGS

Other advantages and characteristics of the invention will become apparent on examining the detailed description of the embodiments and modes of implementation, which are in no way limiting, and the appended drawings, in which FIG. 1 diagrammatically illustrates a transmitter and a receiver for implementing the process according to the present invention.

DETAILED DESCRIPTION OF THE PREFERRED EMBODIMENTS

Figure 1:
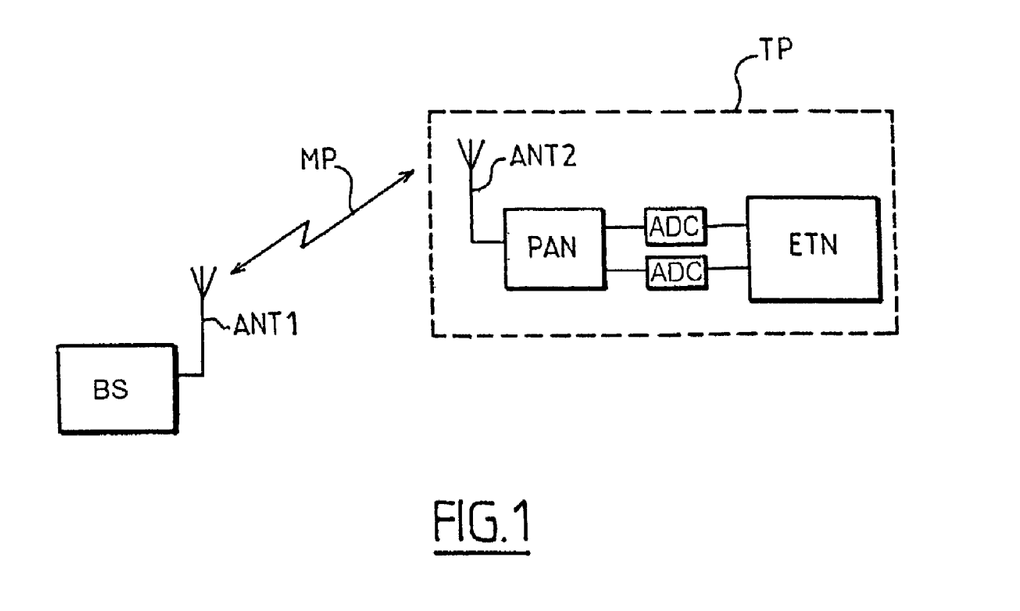

It is now assumed, referring more particularly to FIG. 1, that the invention is applied, for example, to cellular mobile telephones of the GSM network system. In FIG. 1, the reference BS designates a transmitter, such as a base station for example. The base station receives the useful data to be transmitted, such as speech for example, and in particular performs the so-called "channel coding" conventional processing by introducing redundancies into the data stream.

The station BS also conventionally comprises a modulator performing, for example, a quadrature modulation of the QPSK type to transform the binary signal emanating from the channel coding processing into an analog signal. The analog signal is then filtered using a transmission filter before being transmitted towards the receiver TP via an antenna ANT1.

The base station BS and the receiver TP represent a cellular mobile telephone system, and the means of propagation MP in the present case is air. The cellular mobile telephone TP comprises at the frontend an antenna ANT2 coupled to an analog stage PAN carrying out frequency conversion. Frequency conversion reduces the received signal to a baseband signal. The analog stage PAN also filters the received signal for retaining only the useful part of the spectrum.

After sampling and analog/digital conversion in a converter ADC, the digital stage ETN produces an estimation of the transmission channel, removes the intersymbol interference (through equalization) based upon the estimations, and performs error correction. That is, a conventional channel decoding based on a Viterbi decoder, for example, is performed.

In terms of hardware, the entire digital stage ETN can be embodied, for example, as a signal processor. The various processing operations performed in this stage ETM are carried out via software. The various processing operations are then in the form of program code which can easily be written by one skilled in the art based upon the functional definition of these processing operations. The program code is stored in a read only memory associated with the processor, for example. However, a full hardware embodiment or a partial hardware embodiment is also possible, such as in the form of an application specific integrated circuit (ASIC), for example.

Figure 2:
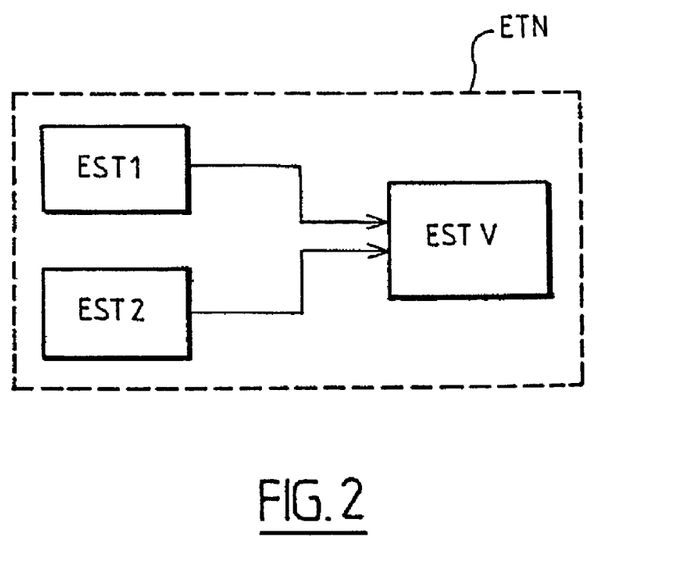
FIG. 2 illustrates in greater detail but still diagrammatically the various estimation means of the receiver illustrated in FIG. 1.

Referring now to FIG. 2, the digital stage ETN comprises in accordance with the invention first means of estimation EST1 for performing an estimation of the impulse response of the channel, second means of estimation EST2 for performing an estimation of the time derivative of this impulse response of the channel, and means of estimating the speed ESTV. The means for estimating the speed ESTV provides an indication regarding the speed of movement of the receiver TP. This estimation is based upon the determination of a ratio comprising a denominator that takes into account the energy of the estimated impulse response, and a numerator that takes into account the energy of the estimated time derivative of this impulse response.

Figure 6:
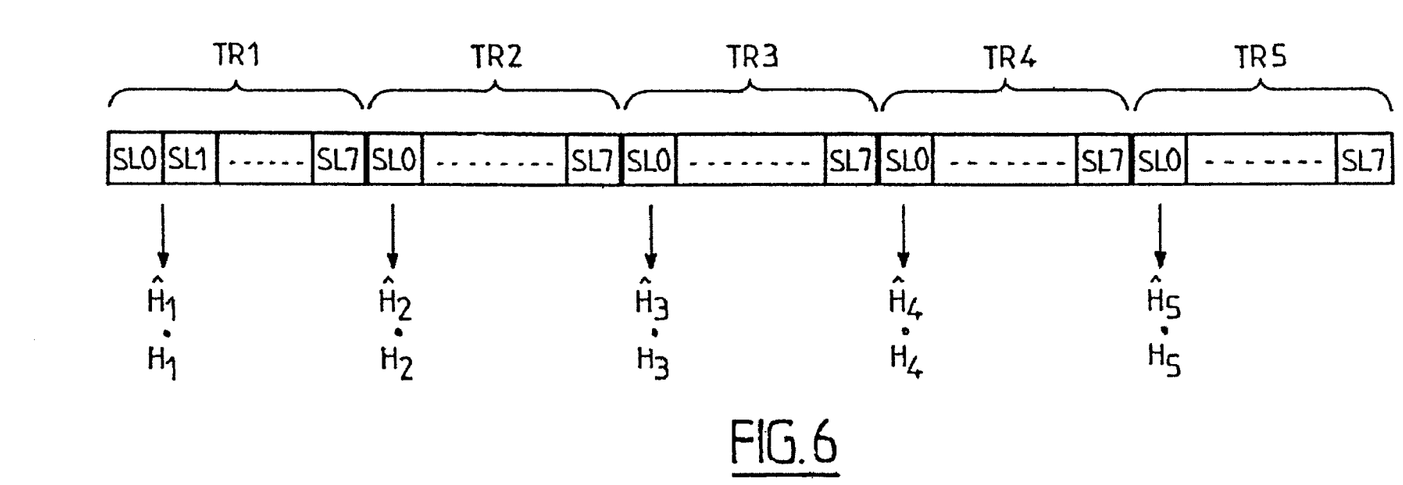
FIG. 6 diagrammatically illustrates the speed estimation based upon several estimations of the impulse response and of their time derivatives at successive instants according to the present invention.

As illustrated in FIG. 6, in a transmission system of the type TR1, such as the GSM system for example, the transmission channel is temporally subdivided into frames TRi. Each frame comprises several time intervals SLi, otherwise known as slots. As a general rule, the transmission of the information between the base station and the terminal is performed over the successive frames within a single time interval of each frame. Stated otherwise, one slot is allocated to the telephone within each frame, such as the interval SL0, for example.

Nonetheless, it is possible in certain applications to have a so-called "multi-slot" transmission. In this case, the transmission of the information between the base station and the terminal is performed within several consecutive time intervals of each frame, such as within two consecutive time intervals, for example. Stated otherwise, in this case, two consecutive time intervals are allotted to the telephone within each frame, such as the intervals SL0 and SL1, for example.

Figure 3:
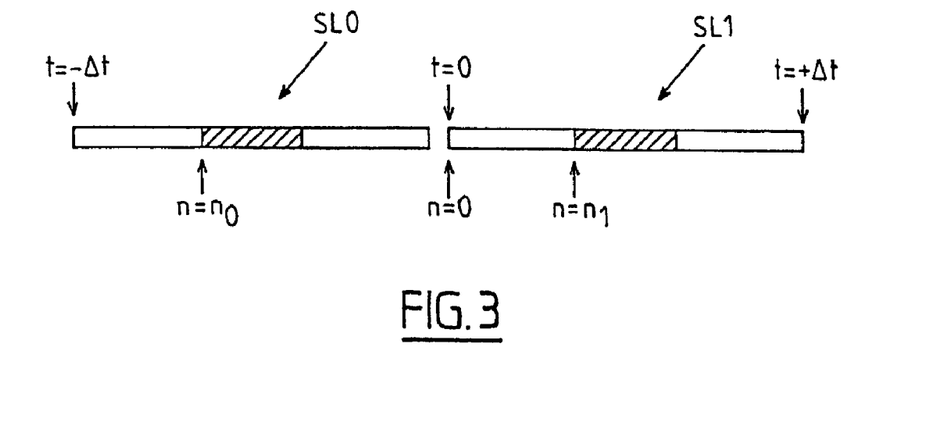
FIGS. 3 to 5 diagrammatically and partially illustrate estimations of the impulse response of the channel and of its time derivative in three different implementations according to the present invention.

In a first variation of the invention, as illustrated in FIG. 3, it is assumed that we have a multislot transmission. In each frame, the intervals SL0 and SL1 are allotted to the telephone TP. The impulse response h of the transmission channel can be approximated to a first order and over a sufficiently short time interval by the formula (I):

$$h(t,\tau) = \bar{h}(t_0,\tau) + (t-t_0) \cdot \dot{\bar{h}}(t_0,\tau) \quad \text{(I)}$$

in which t designates time.

The person skilled in the art is furthermore aware that each interval comprises a certain number of symbols $s_n$. In particular, a sequence of known symbols commonly designated as a training sequence. If a change of origin is performed, in which it is assumed that $t_0=0$, then with the notation of FIG. 3, an interval SL1 beginning at the instant 0 and finishing at the instant $+\Delta t$ is obtained. Furthermore, the n symbols making up this interval begin at $n=0$. The training sequence begins at the symbol of rank $n_1$.

Likewise, the preceding interval SL0 begins at the instance $-\Delta t$ and the training sequence begins at the symbol of rank $-n_0$. If s(t) designates the signal to be transmitted, the latter is composed of symbols $s_n$ and is defined by the formula (II) below:

$$s(t) = \sum_n s_n \cdot \delta(t - n \cdot Ts) \quad \text{(II)}$$

In this formula, Ts designates the duration between two symbols and the function $\delta$ is a (Dirac) comb function. More precisely, $\delta(t-n*Ts)$ is equal to 1 when $t=n*Ts$ and is equal to 0 in the converse case.

The signal received by the telephone can be approximated to a first order and over a sufficiently short time interval by formula (III) below:

$$x(t) = s(t) * h(t,\tau) = \int s(t-\tau) \cdot h(t,\tau) \cdot d\tau \quad \text{(III)}$$

Consequently, the sample received $x_n$ can be written in accordance with formula (IV) below:

$$x_n = \sum_{k=0}^{L-1} s_{n-k} \cdot \left[ \hat{h}_k + n \cdot Ts \cdot \dot{\hat{h}}_k \right] \quad \text{(IV)}$$

in which $\hat{h}_k$ designates the L coefficients of the estimated optional response of the channel and $\dot{\hat{h}}_k$ designates the coefficients of the time derivative of this impulse response.

By making the nonessential assumption that the same training sequence of 26 known symbols was used in both the consecutive intervals SL0 and SL1, we then have for $0 \leq m \leq 26$:

$$s_{-n_0+m} = s_{n_1+m} = t_m$$

By next defining two new variables $N_0$ and $N_1$ respectively by the formulas (VI) and (VII) below:

$$-N_0 = -n_0 + L - 1 \quad \text{(VI)}$$

$$N_1 = n_1 + L - 1 \quad \text{(VII)},$$

we then obtain a set of $2*(26-L+1)$ equations with 2L unknowns, as is defined below for $0 \leq m < 26-L+1$:

$$\begin{cases} x_{-N_a+m} = \sum_{k=0}^{L-1} t_{L-1+m-k} \cdot \left[ \hat{h}_k + (-N_0+m) \cdot Ts \cdot \dot{\hat{h}}_k \right] \\ x_{N_1+m} = \sum_{k=0}^{L-1} t_{L-1+m-k} \cdot \left[ \hat{h}_k + (N_1+m) \cdot Ts \cdot \dot{\hat{h}}_k \right] \end{cases} \quad \text{(VIII)}$$

By solving this equation system (VIII) by any conventional method, such as with the least squares method for example, it is possible to obtain jointly the coefficients of the estimated impulse response of the transmission channel and the coefficients of the time derivative of this estimated impulse response.

Figure 4:
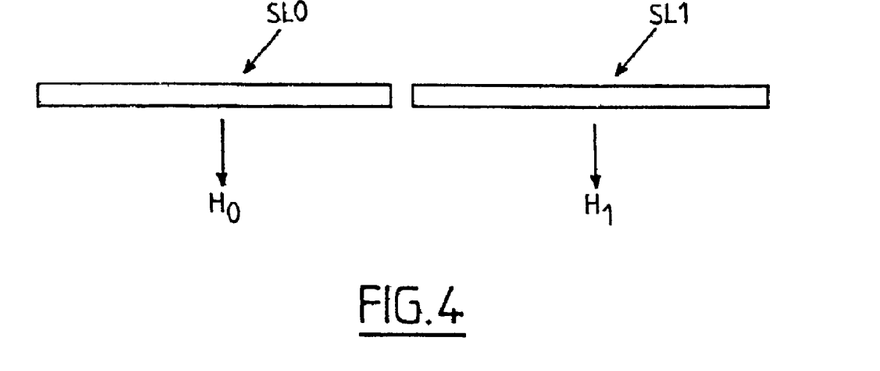

In another variation of the invention, likewise compatible with multi-slot transmission, it is possible, as illustrated in FIG. 4, to estimate the impulse response of the channel and its time derivative on the basis of two independent successive estimations $H_0$ and $H_1$ performed in the two consecutive intervals SL0 and SL1, respectively.

Each of the two impulse responses is estimated by any known method, such as the least squares method for example, or if the training sequences are not available, by the so-called "blind" estimation, that is, in which no predetermined training sequence is used.

The person skilled in the art knows various methods of performing the blind estimations of the impulse response of a channel. By way of indication, mention may be made of the article by Jitendra K. Tugnait, entitled "Blind Estimation of Digital Communication Channel Impulse Response", IEEE Transactions On Communications, Vol. 42, No. 2/3/4, February/March/April 1994. The estimation of the impulse response of the channel is then obtained in accordance with formula (IX) below by averaging the two independent successive estimations $H_0$ and $H_1$.

The estimation of the time derivative is performed by determining the time variation over the duration $\Delta t$ separating the two estimations, between these two independent successive estimations $H_1$ and $H_0$, likewise in accordance with formula (IX) below:

$$\begin{cases} \hat{H} = (H_1 + H_0)/2 \\ \dot{H} = (H_1 - H_0)/\Delta t \end{cases} \qquad \text{(IX)}$$

Figure 5:
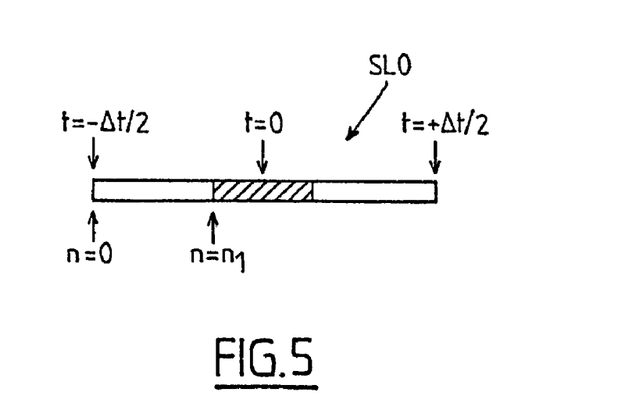

When the transmission is not a multi-slot transmission, but is performed within a single interval allotted to the telephone, such as the interval SL0 for example, the estimation of the impulse response of the channel and the estimation of its time derivative are performed on the basis of the information received in this single time interval.

More precisely, if reference is made to FIG. 5 and if the same notation as that used in conjunction with FIG. 3 and with formula (I) to (VIII) above is used, the samples of the received signal are then defined by the formula (X) below for $0 \leq m < 26-L+1$.

$$x_{N_1+m} = \sum_{k=0}^{L-1} t_{L-1+m-k} \cdot \left[ \hat{h}_k + \left( \frac{L-26}{2} + m \right) \cdot Ts \cdot \dot{h}_k \right] \qquad \text{(X)}$$

This time we have a set of 26−L+1 equations with 2L unknowns. Such a system can likewise be solved by the method of least squares, although it gives a less accurate estimation than that obtained with the multislot transmission variation.

Irrespective of the variation used, the means of estimation of speed MEST will, in a general manner, determine the energy $\hat{E}$ of the estimated impulse response of the channel. This energy $\hat{E}$ is defined by formula (XI) below:

$$\hat{E} = \sum_i |\hat{h}_i|^2 \qquad \text{(XI)}$$

Furthermore, the means of estimation of speed will in the same way determine the energy $\dot{E}$ of the time derivative of the estimated impulse response in accordance with formula (XII) below:

$$\dot{E} = \sum_i |\dot{h}_i|^2 \qquad \text{(XII)}$$

The ratio $\dot{E}/\hat{E}$ is then linked to the speed V of movement of the telephone in accordance with the formula (XIII) below:

$$\dot{E}/\hat{E} = 2\pi^2 \, FO \, V^2/C \qquad \text{(XIII)}$$

The general principle thus described of the invention is implemented to take account of the noise which generally spoils the estimations of the impulse response of the channel and of its derivative. To take account of the noise and smooth any variations, it is especially advantageous for the means of estimation to compute a first average, such as a sliding average for example, of successive values of energy corresponding to channel impulse responses successively estimated at successive instants. Likewise, the means of estimation of speed computes a second average, also a sliding average for example, of successive values of energy corresponding to the time derivatives of the successively estimated impulse responses.

More precisely, if reference is made to FIG. 6, the successive instants are situated within the successive frames Tri. Each frame Tri makes it possible to obtain, for the telephone TP, at a predetermined instant which depends on the variation used, an estimation $\hat{H}_i$ of the impulse response of the channel and an estimation $\dot{H}_i$ of its time derivative. On the basis of these two values the energy $\hat{E}_i$ and the $\dot{E}_i$ corresponding to the frame Tri are calculated. The first sliding average $m_i$ is then defined by formula (XIV):

$$m_i = (1-\alpha)m_{i-1} + \alpha \hat{E}_i \qquad \text{(XIV)}$$

the second sliding average $p_i$ is defined by formula (XV):

$$P_i = (1-\alpha)P_{i-1} + \alpha \dot{E}_i \qquad \text{(XV)}$$

In these two formulas, the coefficient $\alpha$ is a coefficient which varies between 0 and 1, and which can take different values in the two formulas. If $\alpha$ is close to 1, we then have good reactivity, that is, the new measurement is taken strongly into account and the past average will be neglected. If on the other hand $\alpha$ is close to 0, we rely on the previous average. The person skilled in the art will be able to adjust the value of $\alpha$ as a function of the application. The ratio $p_i/m_i$ gives an estimation of the speed of movement of the mobile platform.

Furthermore, the estimation noise in the coefficients of the impulse response and of its derivative give rise to a bias in the estimation of their energy. When the average energy of the estimation noise is known, in particular in the GSM system, it is preferable to deduct this energy so as to obtain unbiased estimations. Hence, it is preferable to deduct the average energy of the noise from the corresponding values of energy $\hat{E}$ and $\dot{E}$ before computing the ratio which will provide an estimation of the speed of movement of the mobile.

The invention is not limited to the embodiments and examples just described, but embraces all variations thereof. Thus, while having alluded more precisely to systems using frequency division and/or time division (TDMA and/or FDMA) such as those applied in GSM systems, the invention applies equally to CDMA systems which allow multiple users to share a common frequency and a common time channel by using coded modulation. By way of indication, mention may be made of the CDMA 2000 system, the WCDMA system or the IS95 standard. Furthermore, the invention can also be implemented and embodied in a base station BS.

That which is claimed is:

1. A process for estimating a speed of movement of a mobile terminal operating in a wireless communication system and communicating with a base station via a transmission channel, the process comprising:

estimating an impulse response of the transmission channel at a given instant;

estimating a time derivative of the estimated impulse response; and determining a ratio between energy of the estimated impulse response and energy of the estimated time derivative.

2. A process according to claim 1, wherein the energy of the estimated impulse response is in a denominator of the ratio and the energy of the estimated time derivative is in a numerator of the ratio.

3. A process according to claim 1, wherein estimating the impulse response comprises averaging two independent successive estimations of the impulse response separated by a predetermined duration for preserving a correlation between the two successively estimated impulse responses; and wherein estimating the time derivative comprises determining a time variation over the predetermined duration between the two independent successive estimations of the impulse response.

4. A process according to claim 3, wherein the transmission channel is temporally subdivided into frames each comprising a plurality of time intervals, and transmission of information between the base station and the mobile terminal is performed over successive frames within at least two consecutive time intervals of each frame.

5. A process according to claim 4, wherein the two independent successive estimations of the impulse response are performed based upon respective information received in the at least two consecutive time intervals.

6. A process according to claim 4, wherein estimating the impulse response and estimating the time derivative are performed jointly based upon information received in the at least two consecutive time intervals.

7. A process according to claim 1, wherein the transmission channel is temporally subdivided into frames each comprising a plurality of time intervals, and transmission of information between the base station and the mobile terminal is performed dyer successive frames within a single time interval of each frame.

8. A process according to claim 7, wherein estimating the impulse response and estimating the time derivative are performed based upon information received in each respective single time interval.

9. A process according to claim 1, wherein estimating the impulse response and estimating the time derivative are influence by noise; and
wherein determining the ratio comprises deducting a mean energy of the noise from the two corresponding values of energy.

10. A process according to claim 1, wherein the energy of the estimated impulse response comprises determining a first average of successive values of energies corresponding to impulse responses successively estimated at successive instants; and wherein the energy of the estimated time derivative comprises determining a second average of successive values of energies corresponding to the time derivatives of the successively estimated impulse responses.

11. A process according to claim 10, wherein determining the first and second averages are respectively based upon a sliding average.

12. A process according to claim 1, wherein the estimating and the determining are performed by at least one of the mobile terminal and the base station.

13. A cellular telephone comprising:
a device for estimating a speed of movement of the cellular telephone operating in a wireless communication system and communicating with a base station via a transmission channel, said device comprising
first estimation means for estimating an impulse response of the transmission channel at a given instant,
second estimation means for estimating a time derivative of the estimated impulse response, and
speed estimation means for determining a ratio between energy of the estimated impulse response and energy of the estimated time derivative.

14. A cellular telephone according to claim 13, wherein said speed estimation means comprises:
first determination means for determining the energy of the estimated impulse response;
second determination means for determining the energy of the estimated time derivative; and
calculation means for computing the ratio of the two corresponding values of energy.

15. A cellular telephone according to claim 14, wherein said first estimation means estimates the impulse response by averaging two independent successive estimations of the impulse response separated by a predetermined duration for preserving a correlation between the two successively estimated impulse responses; and wherein said second estimation means estimates the time derivative by determining a time variation over the predetermined duration between the two independent successive estimations of the impulse response.

16. A cellular telephone according to claim 15, wherein the transmission channel is temporally subdivided into frames each comprising a plurality of time intervals, and transmission of information between the base station and the cellular telephone is performed over successive frames within at least two consecutive time intervals of each frame.

17. A cellular telephone according to claim 16, wherein said first estimation means performs the two respective successive estimations of the impulse response based upon the information received in the at least two consecutive time intervals.

18. A cellular telephone according to claim 16, wherein said first and second estimation means jointly estimate the impulse response and the time derivative based upon information received in the at least two consecutive time intervals.

19. A cellular telephone according to claim 13, wherein the transmission channel is temporally subdivided into frames each comprising a plurality of time intervals, and transmission of information between the base station and the cellular telephone is performed over successive frames within a single time interval of each frame.

20. A cellular telephone according to claim 19, wherein said first estimation means estimates the impulse response and said second estimation means estimates the time derivative based upon information received in each respective single time interval.

21. A cellular telephone according to claim 14, wherein estimating the impulse response and estimating the time derivative are influenced by noise, and wherein said first and second determination means comprises subtraction means for deducting a mean energy of the noise from the two corresponding values of energy.

22. A cellular telephone according to claim 14, wherein said first determination means comprises first smoothing means for computing a first average of successive values of energies corresponding to impulse responses successively estimated at successive instants; and
wherein said second determination means comprises second smoothing means for computing a second average of successive values of energies corresponding to the time derivatives of the successively estimated impulse responses.

23. A cellular telephone comprising:
an antenna;
an analog stage connected to said antenna; and
a digital stage connected to said analog stage for estimating a speed of movement of the cellular telephone by
estimating an impulse response of a transmission channel at a given instant,
estimating a time derivative of the estimated impulse response, and
determining a ratio between energy of the estimated impulse response and energy of the estimated time derivative.

24. A cellular telephone according to claim 23, wherein determining the ratio comprises:
   determining the energy of the estimated impulse response;
   determining the energy of the estimated time derivative; and
   computing the ratio of the two corresponding values of energy.

25. A cellular telephone according to claim 24, wherein estimating the impulse response comprises averaging two independent successive estimations of the impulse response separated by a predetermined duration for preserving a correlation between the two successively estimated impulse responses; and wherein estimating the time derivative comprises determining a time variation over the predetermined duration between the two independent successive estimations of the impulse response.

26. A cellular telephone according to claim 25, wherein the transmission channel is temporally subdivided into frames each comprising a plurality of time intervals, and transmission of information between the base station and the cellular telephone is performed over successive frames within at least two consecutive time intervals of each frame.

27. A cellular telephone according to claim 26, wherein estimating the impulse response comprises estimating the two respective successive estimations of the impulse response based upon the information received in the at least two consecutive time intervals.

28. A cellular telephone according to claim 26, wherein the impulse response and the time derivative are jointly estimated based upon information received in the at least two consecutive time intervals.

29. A cellular telephone according to claim 23, wherein the transmission channel is temporally subdivided into frames each comprising a plurality of time intervals, and transmission of information between the base station and the cellular telephone is performed over successive frames within a single time interval of each frame.

30. A cellular telephone according to claim 29, wherein the impulse response and the time derivative are estimated based upon information received in each respective single time interval.

* * * * *

UNITED STATES PATENT AND TRADEMARK OFFICE
CERTIFICATE OF CORRECTION

PATENT NO. : 7,254,369 B2  Page 1 of 1
APPLICATION NO. : 10/233055
DATED : August 7, 2007
INVENTOR(S) : David Chappaz It is certified that error appears in the above-identified patent and that said Letters Patent is hereby corrected as shown below:

Column 9, Line 24    Delete: "dyer"
                     Insert: -- over --

Signed and Sealed this

Fourth Day of March, 2008

JON W. DUDAS
*Director of the United States Patent and Trademark Office*